United States Patent [19]

Miller

[11] 3,767,165

[45] Oct. 23, 1973

[54] SHAFT RETAINING MEANS FOR HYDROSTATIC STEERING DEVICES

[75] Inventor: Laurence L. Miller, West Lafayette, Ind.

[73] Assignee: TRW Inc., Cleveland, Ohio

[22] Filed: July 5, 1972

[21] Appl. No.: 269,161

[52] U.S. Cl............. 251/213, 137/625.24, 308/234
[51] Int. Cl............................................. F16k 31/44
[58] Field of Search..................... 91/368, 382, 375; 137/625.21, 625.24; 418/61; 308/234; 251/213

[56] References Cited
UNITED STATES PATENTS

| | | | |
|---|---|---|---|
| 3,227,178 | 1/1966 | Elwell | 137/625.21 |
| 3,365,040 | 1/1968 | Pitner | 308/234 X |
| 3,584,648 | 6/1971 | Lubos | 418/61 X |
| 3,598,509 | 8/1971 | Goff et al. | 418/61 |

Primary Examiner—Henry T. Klinksiek
Attorney—Benjamin H. Sherman et al.

[57] ABSTRACT

A structure for retaining the steering shaft of a hydrostatic steering device in the same operative axial position irrespective of the number of adjusting shims employed to operatively position the valve member actuated by the shaft, or the presence or absence of pressure in the hydraulic system of the device and which is so constructed that no restraining forces on the shaft tending to produce relatively high frictional forces and causing high steering torques are produced.

14 Claims, 4 Drawing Figures

Patented Oct. 23, 1973 3,767,165
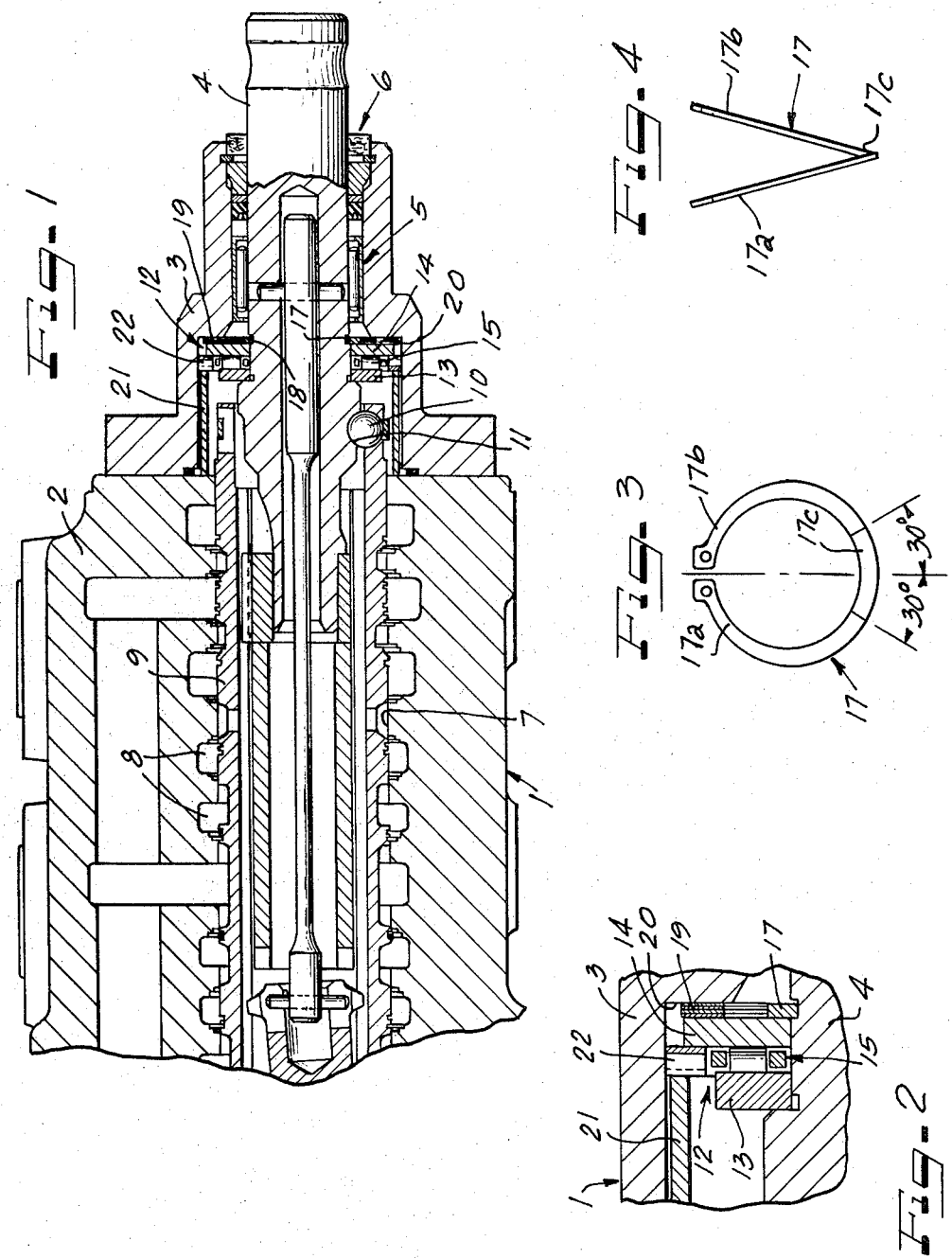

SHAFT RETAINING MEANS FOR HYDROSTATIC STEERING DEVICES

BACKGROUND OF THE INVENTION

The invention is directed generally to hydrostatic steering devices and more particularly to a novel retaining structure which prevents undesired axial movement of the operating or actuating shaft thereof under all positions of axial shaft adjustment and varying operational hydraulic conditions.

Illustrations of the general type of steering devices here involved are illustrated, for example, in U.S. Pat. No. 3,452,543, granted July 1, 1969 to R. L. Goff et al. and No. 3,597,128, granted on Aug. 3, 1971 to Fredrich D. Veneable et al.

Steering devices of the type here involved employ a rotatable actuating shaft, for example, adapted to be actuated by a steering wheel mounted thereon, which is operative to control the movement of a metering spool valve member, the operational positioning of which determined the hydraulic operation of the structure. As the operative positioning of the spool valve member must be quite exact, irrespective of manufacturing tolerances in the components of the assembly, structures have been designed to accommodate suitable adjusting shims, operative to accurately position the shaft and therewith the spool valve member. However, in many cases the shims are basically operative in only one direction, i.e., under the action of fluid pressure within the hydraulic system whereby the actuating shaft may be adequately retained in an axially fixed position in the presence of hydraulic pressure but capable of an amount of axial retraction in the absence of such hydraulic pressure. An undesirable amount of axial play is thus introduced into the structure, for example, in situations prior to operation of the vehicle engine or in the event the vehicle is steered without the engine operating. Under such conditions the steering shaft can be moved in and out of the steering device with a small amount of force, and as the shaft will normally be retracted when the device is inoperative, upon starting the engine the increased fluid pressure inside the steering device will cause a corresponding extension of the shaft to its normal operating position. The cost to fabricate a single spacing member to the exact length required to accommodate the particular number of shims employed in any given assembly is prohibitive.

The present invention is therefore directed to a shaft assembly which is maintained in axially fixed relation irrespective of the operative condition of the device and which will not introduce undesired operational characteristics in the actuation of the shaft and thus the operation of the device, and which enables accurate positioning of the spool valve member.

BRIEF SUMMARY OF THE INVENTION

The problem presented is solved in the present invention by the utilization of a suitable bearing assembly which is carried by the actuating shaft in an operationally axially fixed relation, provision being made to provide an adjustment, for example, by means of suitable shims, in the position of the bearing assembly relative to the stationary housing of the device, to operatively axially position the actuating shaft and thereby accurately position the controlling spool valve member, relative to its cooperable valve body, for the desired operation. Resilient means is provided for accommodating the operational thickness range of adjustment shims, and at the same time operatively retain the parts in the desired axial position irrespective of the presence and absence of pressure in the hydraulic system.

BRIEF DESCRIPTION OF THE DRAWINGS

In the drawing wherein like reference characters indicate like or corresponding elements:

FIG. 1 is a longitudinal sectional view of a hydrostatic steering device illustrating details of the present invention;

FIG. 2 is an enlarged detail of a portion of FIG. 1;

FIG. 3 is a plan view of retaining ring employed; and

FIG. 4 is a side elevation of the retaining ring illustrated in FIG. 3.

DESCRIPTION OF THE PREFERRED EMBODIMENT

Hydrostatic steering devices of the type illustrated in the reference patents generally include a fluid controller for regulating the flow of pressurized fluid to a hydraulically operated device and includes in a single casing a gear set which may serve as a fluid meter, in cooperation with an axially shiftable spool valve for controlling the flow of fluid through the gear set and to a hydraulically operated device. A control or actuating shaft is rotatably mounted on the casing in axial alignment with the spool valve and is coupled to the valve so that rotation of the control shaft in opposite directions causes the spool valve to shift axially in opposite directions from a neutral position to axially spaced operating positions.

The coupling between the control shaft and the spool valve may comprise a cooperating helical groove and ball arrangement, and further may comprise means to provide joint rotation between the shaft and the valve but to permit some limited relative rotation therebetween.

Referring to the drawings, and particularly to FIG. 1, the reference numeral 1 designates generally a housing structure which, in the construction illustrated, comprises a main section 2, and a smaller end section 3, suitably secured to the section 2. Rotatably mounted in the housing 1 is an actuating or control shaft 4 (which may, for example, carry a steering wheel) having an axis of rotation which coincides with a longitudinal axis of the housing 1, with the free end of the shaft extending through the section 3, aNd connected therewith by suitable roller bearings 5, with the free end of the shaft being suitably sealed by respective sealing and retaining rings designated generally by the numeral 6.

The housing section 2 is provided with an axially extending bore 7 therein provided with a plurality of ports 8, cooperable with a control valve member, herein termed a "spool valve member" which is cooperably coupled to the shaft 4 by means of a ball 10, seated in a cooperable recess in the valve member 9, and riding in a cooperable helical groove 11 in the periphery of the shaft 14. The latter also may be provided with a radially extending stud (not illustrated) carried by the shaft and having an outer portion disposed in an axially extending slot in the valve member 9, the longitudinal sides of the slot being spaced circumferentially a distance greater than the cooperable portion of the stud to permit a desired amount of relative rotation between the shaft and the valve member, with relative axial movement between the shaft and valve member being determined by the configuration of the helical groove 11. Thus, the valve member may have both axial and rotative movement relative to the shaft 4.

As the other details of the hydrostatic steering device form no part of the present invention and various forms of construction may be employed therein, further description of other illustrated parts of the device is deemed unnecessary to a full understanding of the present invention.

The embodiment of the invention illustrated includes a bearing assembly indicated generally by the numeral 12, comprising a pair of bearing races 13 and 14 between which is disposed a needle bearing 15 comprising, for example, a plurality of needle bearings and suitable separator therefor, the race 13 disposed adjacent the spool valve member 9, being termed the "inner" race and the race 14 being termed the "outer" race.

As will be apparent from a reference to FIGS. 1 and 2, the inner race 13 has a lesser outer diameter than the race 14 and is adapted to axially seat on a shoulder or abutment 16 formed on the shaft 4, whereby axial forces in a direction toward the free end of the shaft 4 are transmitted to the race 13. The bearing assembly 12 is retained in operative axial position on the shaft 4 by a retaining ring of the split type having its inner edge portions seated in a cooperable groove 18 formed in the shaft 4. The axial distance between the abutment 16 and the retaining ring 17, with respect to the corresponding dimensions of the bearing assembly is such that the latter is relatively snugly retained in axial position on the shaft 4 without undesired prestressing of the bearing.

As illustrated in FIG. 2, the split retaining ring 17 is provided with a twist between the opposite leg portions 17a and 17b thereof with such twist taking place through an arc 17c not greater than 30° to each side of the diametrical centerline passing between the free ends of the two leg portions. With such construction the retaining ring, when seated in the groove 18, will be firmly and, for operational purposes, rigidly secured to the shaft with any axial play between the ring and shaft being eliminated. Consequently, with this construction the bearing assembly 12 may be considered as carried on the shaft 4 in axially fixed relation.

The bearing assembly 12 and thus the shaft 4, and thereby the operational axial positioning of the spool valve member 9 with respect to the ports 8, is adjusted and determined by shims 19 which are disposed concentrically with the retaining ring 17 and interposed between the adjacent outer face of the bearing race 14 and the abutment 20, formed as a radially extending face on the end section 3. Thus, by varying the number of shims and possibly the thickness of the shims the assembly including the bearing assembly 12, shaft 4 and spool valve member 9 may be axially adjusted to position the spool valve member 9 in accurate desired operational relationship with respect to the ports 8 in the housing.

It will be particularly noted that pressure in the hydraulic system during the operation of the device will firmly retain the shaft assembly described in its outermost position, i.e., to the right as viewed in FIG. 1. Inward or retracting movement of the shaft 4 in the absence of pressure in the system is prevented by a sleeve member 21 disposed within the housing section 2 and seated at its inner end on the adjacent end face of such section, in cooperation with an annular wave spring 22.

The spring 22 is disposed substantially concentric with the needle bearings 15, and is axially interposed between the adjacent end of the sleeve member 21 and the radially outer portion of the inner face of the race member 14.

It will be apparent that in this construction the outer race member 14 is maintained in firm, fixed engagement, at all times, with the shims 19, as the wave spring 22 is constructed to provide sufficient resiliency to permit its compression when the number and size of the shims 19 provide maximum thickness and at the same time provide sufficient expansion forces acting on the bearing race 14, when the thickness of the shims is at a minimum, to insure a firm retention of the bearing race 14, and with it the bearing assembly 12 and shaft 4, in their normal positions even in the absence of pressure in the hydraulic system and the presence of normal manual loads applied to the shaft in axially inward direction.

Under normal manufacturing tolerances, the number of shims required to suitably position the valve spool member will vary by approximately 0.100 inches. Consequently, a single wave spring washer and tubular spacer sleeve are adequate to retain the shaft and associated parts in the desired fixed axial position relative to the supporting member, irrespective of the particular number of shims employed, to provide the desired positioning of the valve spool.

It will be particularly noted from the above, that the construction is such that the retaining assembly introduces no undue frictional forces between the shaft and the housing irrespective of the number of shims employed, and at the same time the shaft is retained in an axially fixed position with respect to the housing and the spool valve accurately positioned with respect to the cooperable valve ports, etc.

Although minor modifications might be suggested by those versed in the art, it should be understood that I wish to embody within the scope of the patent warranted hereon all such modifications as reasonably come within the scope of my contribution to the art.

We claim as our invention:

1. In a hydrostatic steering device having a hydraulic power system which includes a stationary valve body, a shaft rotatable in the body and a valve member movable in predetermined relation relative to said shaft, the combination of a bearing assembly disposed on said shaft, means on said shaft for supporting said assembly thereon in substantially fixed axial relation and operative to transmit hydraulic pressure, acting on said shaft in axial direction, to said bearing assembly, at least one shim member disposed between the outermost face of said bearing assembly and an adjacent opposed fixed abutment, operative to axially so position said bearing assembly and shaft that the valve member will be disposed in predetermined operative axial alignment with the stationary valve body in the presence of pressure in the hydraulic system, and resilient means bearing upon a relatively stationary portion of said bearing assembly and arranged to exert pressure thereon in the direction of said shim to operationally retain said assembly in engagement therewith whereby said shaft is substantially axially fixed relative to said body in the presence or absence of pressure in the hydraulic system.

2. A device according to claim 1 wherein said resilient means comprises wave spring washer.

3. A device according to claim 1 wherein said bearing assembly comprises an inner race of relatively small outer diameter, an outer race of relatively large outer diameter, and antifriction means disposed therebetween having an outer diameter less than that of said outer portion of said outer race, said resilient means bearing on the radially outer portion of said outer race and operative to operationally retain the same in engagmenet with said shim.

4. A device according to claim 3, wherein said antifriction means comprises a plurality of needle bearings and suitable separator therefor.

5. A device according to claim 1 comprising in further combination, a cylindrical sleeve encircling said shaft and having its relatively inner end seated on an axially fixed abutment, the opposite end of said sleeve forming an abutment with which the adjacent portion of said resilient means is engaged.

6. A device according to claim 5 wherein said resilient means comprises a wave spring washer.

7. A device according to claim 1 wherein said bearing retaining means on said shaft comprises an abutment for transmitting axially directed pressure on said shaft to said bearing assembly, and a split retaining ring seated in a groove in said shaft at the opposite side of said assembly.

8. A device according to claim 7 wherein said split retaining ring is of generally U-shaped configuration and has a preset twist therein located at the intermediate portion thereof.

9. A device according to claim 8 wherein said preset twist extends for not more than 30° at each side of a diametrical line extending between the free ends of the leg portions of said U-shaped configuration.

10. A device according to claim 9 wherein the preset twist in said retaining ring is such that the load exerted thereby, after being compressed solid, does not exceed 20 lbs. when restrained between two parallel surfaces spaced approximately 0.05 inches and more than 8 lbs. when restrained between two parallel surfaces spaced approximately 0.06 inches.

11. A device according to claim 8 wherein said bearing assembly comprises an inner race of relatively small outer diameter, an outer race of relatively large outer diameter, and antifriction means disposed therebetween having an outer diameter less than that of said outer portion of said outer race said resilient means bearing on the radially outer portion of said outer race and operative to operationally retain the same in engagement with said shim.

12. A device according to claim 11, wherein said antifriction means comprises a plurality of needle bearings and suitable separator therefor.

13. A device according to claim 12 comprising in further combination, a cylindrical sleeve encircling said shaft and having its relatively inner end seated on an axially fixed abutment, the opposite end of said sleeve forming an abutment with which the adjacent portion of said resilient means is engaged.

14. A device according to claim 13 wherein said resilient means comprises a wave spring washer.

* * * * *